United States Patent [19]

de Willigen et al.

[11] Patent Number: 4,555,148

[45] Date of Patent: Nov. 26, 1985

[54] RECTILINEAR GUIDE COMPRISING FIRST AND SECOND MEMBERS WHICH ARE MOVABLE ONE WITHIN THE OTHER

[75] Inventors: Hans C. de Willigen; Johannes E. Kokken, both of Eindhoven, Netherlands

[73] Assignee: U.S. Philips Corporation, New York, N.Y.

[21] Appl. No.: 675,683

[22] Filed: Nov. 28, 1984

[30] Foreign Application Priority Data

Dec. 1, 1983 [NL] Netherlands ................. 8304140

[51] Int. Cl.$^4$ .................. F16C 29/04; F16C 29/12
[52] U.S. Cl. ................... 308/6 R; 308/6 C; 384/905
[58] Field of Search ............. 308/6 R, 6 C, 3 R, 4 R, 308/DIG. 14, 3 A; 384/905

[56] References Cited

U.S. PATENT DOCUMENTS

| | | | |
|---|---|---|---|
| 3,995,724 | 12/1976 | Katzer | 308/3 R |
| 4,045,936 | 9/1977 | Sterner | 308/3 R |
| 4,302,062 | 11/1981 | Hunter et al. | 308/DIG. 14 |
| 4,515,415 | 5/1985 | Szenger | 308/3 R |

*Primary Examiner*—Lenard A. Footland
*Attorney, Agent, or Firm*—Paul R. Miller

[57] ABSTRACT

A rectilinear guide comprises a first member with a second member coaxially movable in the first member. One of the members comprises bearing elements and the other member comprises axial guide surfaces on which the bearing elements are movable, and which are disposed in planes containing the coinciding central axes of the two members.

3 Claims, 5 Drawing Figures

RECTILINEAR GUIDE COMPRISING FIRST AND SECOND MEMBERS WHICH ARE MOVABLE ONE WITHIN THE OTHER

The invention relates to a rectilinear guide comprising first and second members arranged one within the other and of which one is movable rectilinearly relative to the other with the two members having coinciding central axes extending in the direction of the relative movement between the members, and at least two clusters of bearing elements which are arranged between the members with the clusters being spaced from one another in the direction of the axes and at least one of the members comprising guide surfaces which extend in the direction of the axes and on which the bearing elements are movable.

Such a rectilinear guide is disclosed in German Auslegeschrift No. 28 02 740. The known rectilinear guide comprises a box-shaped first member and a cylindrical second member. The box-shaped member is rectangular in cross-section and has a plurality of axial guide surfaces on the inner side. The guide surfaces serve as sliding surfaces for the bearing elements which are constructed as guide shoes which are secured to the cylindrical member. The sliding surfaces form part of strips which are so arranged in the corner portions of the box-shaped member that each of the sliding surfaces extends perpendicularly to the adjoining wall of the box-shaped member.

A drawback of the known rectilinear guide is that the axial alignment of the first and second members can be influenced by temperature variations in the structure of the rectilinear guide. For example, a temperature variation in one of the two members may give rise to clearance between the guide shoes and the guide surfaces due to different radial expansion or contraction of the members. An excessive clearance between the guide shoes and the guide surfaces may lead to an impermissible radial displacement of one member relative to the other member. Moreover, the clearance between the guide shoes and the guide surfaces may decrease as a result of temperature variations so that the guide shoes may seize against the guide surfaces in the case of an axial displacement of the second member relative to the first member.

The temperature dependence of the known rectilinear guide does not permit an accurately defined and reproducible axial displacement of the second member relative to the first member under varying temperature conditions.

The invention aims at improving the known rectilinear guide so as to obtain a rectilinear guide which is highly insensitive to temperature variation in the guide structure.

To this end the rectilinear guide in accordance with the invention is characterized in that the guide surfaces are situated in planes which contain the coinciding axes of the first and second members. The guide may comprise a hollow first member with the second member arranged movably within it.

In the rectilinear guide in accordance with the invention, and also in the known rectilinear guide, the bearing elements may be secured to the second member and the guide surfaces may be provided in the first member. The first member may be of regular polygonal cross-section but is preferably of circular cross-section. The second member may be hollow or solid and is preferably cylindrical.

An advantage of the rectilinear guide in accordance with the invention is that if one of the two members is subject to temperature changes the bearing elements and/or the guide surfaces move in planes containing the coinciding axes, so that there is no radial displacement of the members relative to each other, which guarantees a perfectly axial displacement of one member relative to the other.

The rectilinear guide in accordance with the invention is suitable for use in apparatus in which very accurate axial displacements of structural parts are required. The rectilinear guide may be employed in, for example, machines such as glass-pressing machines, in optical equipment such as enlargers, and in measuring equipment.

A preferred embodiment of the invention is characterized in that at least one resilient element is arranged between the two members and urges the bearing elements and the guide surfaces toward each other.

The resilient element may be, for example, a coil spring which is constructed as a tension or compression spring of which one end acts on the first member and the other end is secured to the second member. It is obvious that other types of springs may be employed.

An advantage of this embodiment is that a play-free and statically well-defined construction can be obtained in a comparatively simple manner.

Another preferred embodiment is characterized in that the bearing elements comprise rotary elements which cooperate with guide surfaces which are constructed as bearing surfaces.

The rotary elements may be constructed as needle rollers, cylinders or balls which are arranged in the bearing elements in a manner known per se.

An advantage of this embodiment is the high axial movability of the two members relative to each other owing to the low friction, in particular the starting friction, between the bearing elements and the guide surfaces.

An embodiment of the invention will now be described in more detail, by way of example, with reference to the drawings.

Figure 1:
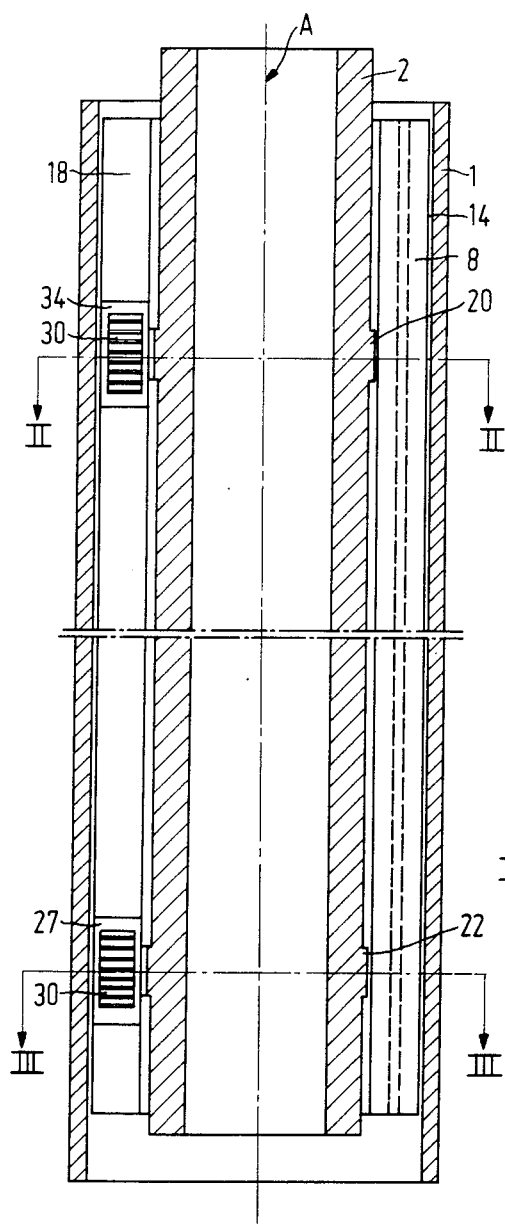
FIG. 1 is a longitudinal sectional view, not to scale, of a rectilinear guide in accordance with the invention taken on the line I—I in FIG. 2.
Figure 2:
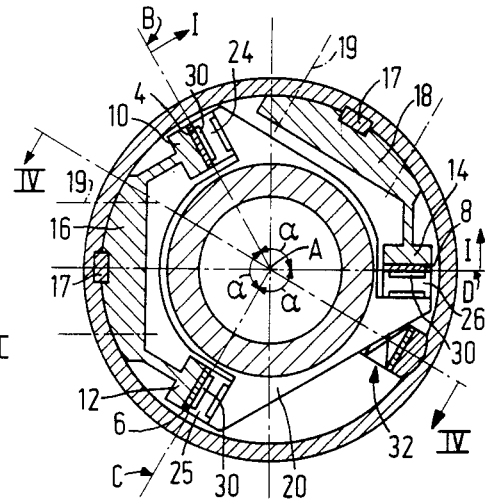
FIG. 2 is a cross-sectional view taken on the line II—II in FIG. 1.

The rectilinear guide in accordance with the invention shown in FIGS. 1 to 5 comprises a first member 1 and a second member 2 which is supported in the first member. The two members 1 and 2 are of circular-cylindrical tubular form and are positioned concentrically relative to each other so that their central axes coincide. The coinciding axes are designated A. The first member 1 comprises three guide surfaces 4, 6 and 8. The guide surfaces 4, 6 and 8 are disposed in planes B, C and D respectively, which each contain the axes A. Since in the present embodiment the members 1 and 2 are of circular cross-section the planes B, C and D may also be referred to as radial planes. The planes B, C and D are equispaced from one another by angles α of 120°. The member 1 is further provided with three rails 10, 12 and 14 on which the guide surfaces 4, 6 and 8 respectively are formed. The rails 10 and 12 are secured to a support 16 and the rail 14 is secured to a support 18. The two supports 16 and 18 are secured to the inner side of the first member 1 by means of wedges 17 and screw-threaded connections which are represented diagrammatically by the dot-dash lines 19.

The second member comprises two axially spaced collars 20 and 22, each carrying a cluster of three bearing elements. The collar 20 carries bearing elements 24, 25 and 26 and the collar 22 carries bearing elements 27, 28, and 29. The bearing elements 24 to 29 are arranged in pairs opposite the rails 10, 12 and 14 in such way that the bearing elements 24 and 27, 25 and 28, and 26 and 29 cooperate with the guide surfaces 4, 6, and 8 respectively.

In the present embodiment the bearing elements 24 to 29 are provided with rotary elements 30 in the form of needle rollers, which can revolve along guide surfaces 4, 6 and 8, acting as bearing surfaces. The number of rotary elements depends inter alia on the requirements imposed on the bearing stiffness.

Figures 4, 5:
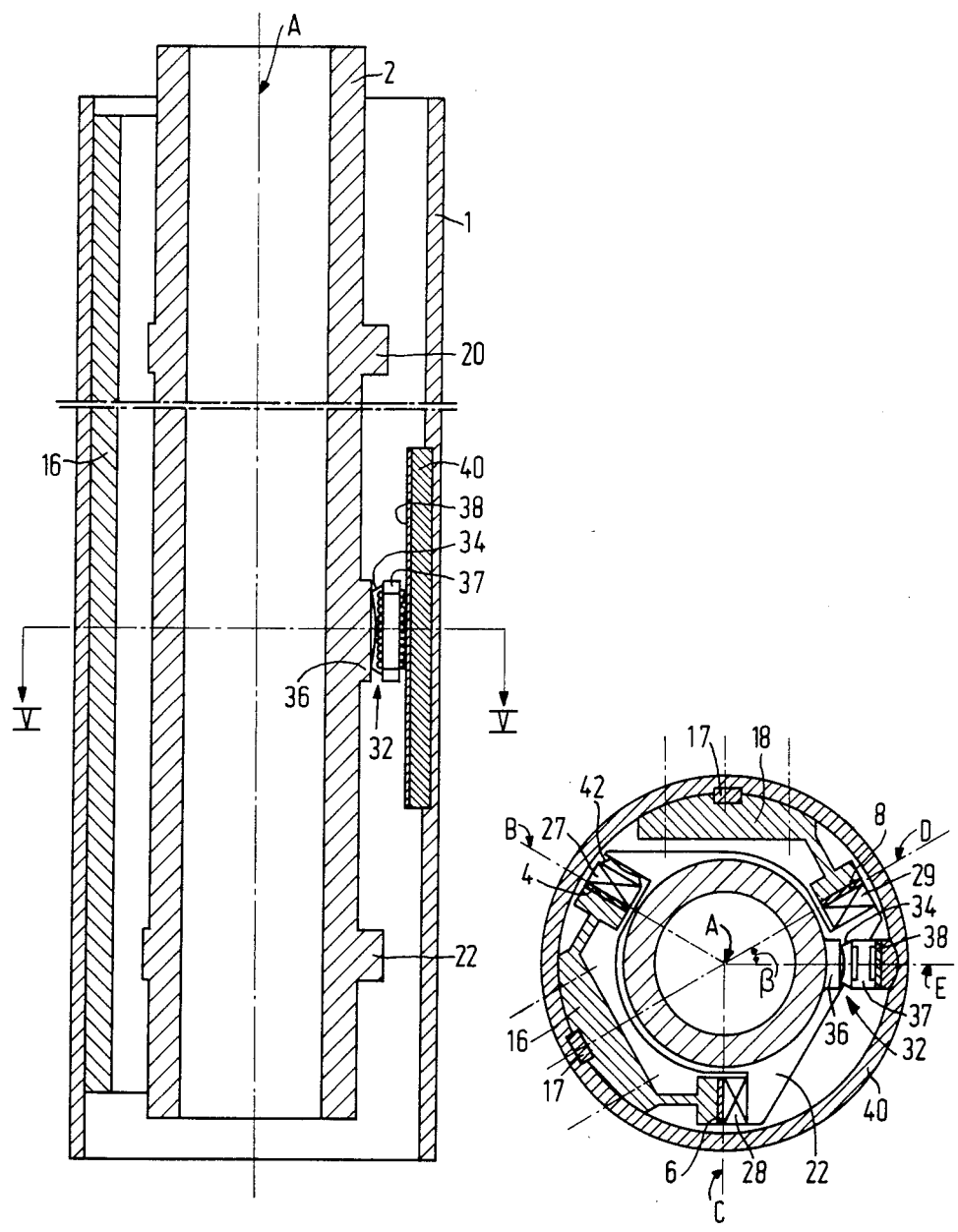
FIG. 4 is a longitudinal sectional view taken on the line IV—IV in FIG. 2 and FIG. 3.
FIG. 5 is a cross-sectional view taken on the line V—V in FIG. 4.

The bearing elements 24 to 29 are urged against the guide surfaces 4, 6 and 8 by a resilient element 32. As is shown in FIG. 5, the resilient element 32 is disposed on a radial plane E which makes an angle β of 30° with the plane D. Obviously, the angle β depends on the number and location of the guide surfaces. The resilient element 32 comprises a Bellerille washer 34, which is secured to a projection 36 on the second member 2 and which acts against an abutment 37 to operate with a bearing surface 38 on a bar 40 which is secured to the first member 1 (FIGS. 4 and 5).

Figure 3:
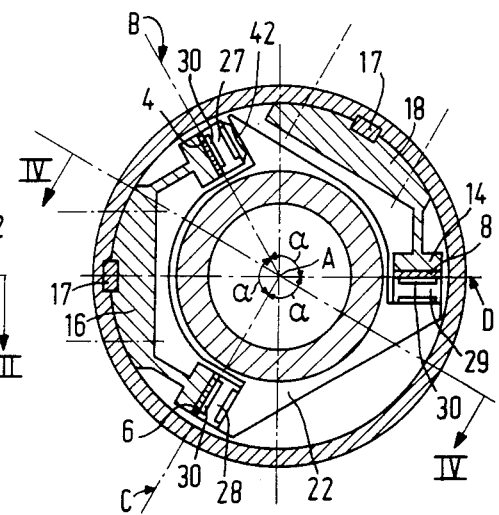
FIG. 3 is a cross-sectional view taken on the line III—III in FIG. 1.

By securing one of the bearing elements 24 to 29 resiliently to the relevant one of the collars 20, 22, a statically defined construction is obtained. For this purpose a blade spring 42 may be arranged between, for example, the bearing element 27 and the collar 22 (FIGS. 3 and 5).

Under operating conditions the two members 1 and 2 are axially movable relative to each other. The bearing elements 24 to 29 then move along the guide surfaces 4, 6 and 8 without the axial alignment of the two members 1 and 2 being affected, and the resilient element 32 moves along the strip 40. If the rectilinear guide is subjected to temperature changes, causing one of the members 1 and 2 or both members 1 and 2 to expand or to contract, this will result in displacements of the bearing elements 24 to 29 and/or the guide surfaces 4, 6 and 8 in the radial planes B, C, and D. This does not affect the coaxial arrangement of the two members 1 and 2, so that an exact axial displacement of the members 1 and 2 relative to each other is guaranteed under varying temperature conditions.

The invention is not limited to the embodiment shown in the drawings. For example, embodiments in which the bearing elements are secured to the second member and the guide surfaces are provided on the first member also fall within the scope of the invention as defined in the appended claims.

What is claimed is:

1. A rectilinear guide comprising first and second members arranged one within the other and of which one is movable rectilinearly relative to the other, the two members having coinciding central axes extending in the direction of the relative movement between the members, and at least two clusters of bearing elements which are arranged between said members, the clusters being spaced from one another in the direction of said axes and at least one of the members comprising guide surfaces which extend in the direction of said axes and on which the bearing elements are movable, characterized in that the guide surfaces are situated in planes which contain said coinciding axes.

2. A rectilinear guide as claimed in claim 1, characterized in that at least one resilient element is arranged between the two members and urges the bearing elements and the guide surfaces towards each other.

3. A rectilinear guide as claimed in claim 1 or 2, characterized in that the bearing elements comprise rotary elements which cooperate with guide surfaces which are constructed as bearing surfaces.

* * * * *